(No Model.)

E. W. KIDNEY.
FILTER.

No. 303,737. Patented Aug. 19, 1884.

WITNESSES

INVENTOR
Edward W. Kidney
By Thos. S. Hall
ATTORNEY

UNITED STATES PATENT OFFICE.

EDWARD W. KIDNEY, OF OLMSTED, OHIO, ASSIGNOR TO THE OLMSTED FALLS FILTER CO., OF SAME PLACE.

FILTER.

SPECIFICATION forming part of Letters Patent No. 303,737, dated August 19, 1884.

Application filed September 25, 1883. (No model.)

*To all whom it may concern:*

Be it known that I, EDWARD W. KIDNEY, a citizen of the United States, residing at Olmsted, county of Cuyahoga, and State of Ohio, have invented certain new and useful Improvements in Filters; and I do hereby declare the following to be a description of the same and of the manner of constructing and using the invention, in such full, clear, concise, and exact terms as to enable any person skilled in the art to which it appertains to construct and use the same, reference being had to the accompanying drawings, which form a part of this specification, the principle of the invention being herein explained, and the best mode in which I have contemplated applying that principle, so as to distinguish it from other inventions.

The object of this invention is to provide an improved form of filter, adapted to cause the water to be gradually conducted through the filtering material, and thereby be thoroughly filtered.

Figure 1:
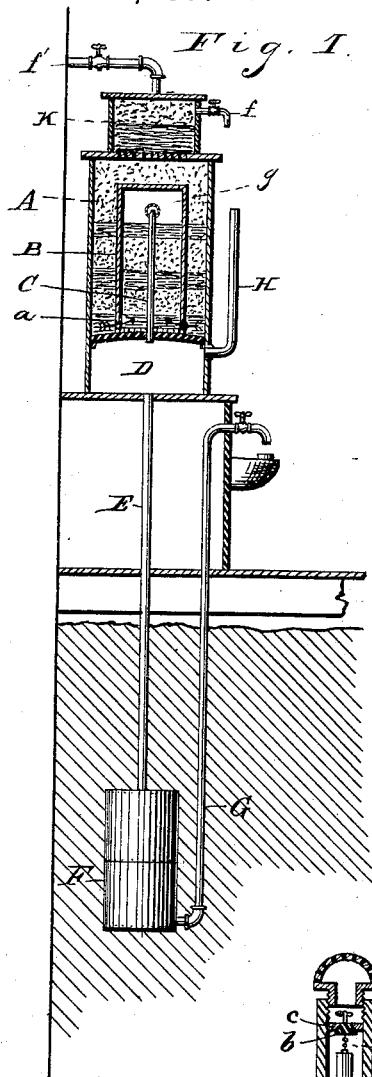
Figure 2:
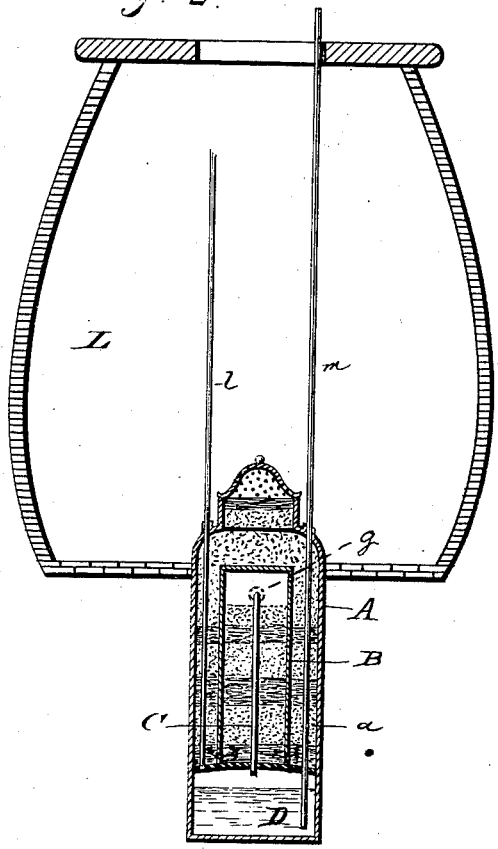
Figure 3:
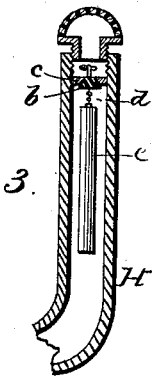

In the drawings, Figure 1 represents the invention in connection with a hydrant. Fig. 2 represents the invention in connection with a cistern. Fig. 3 is a detail view of air-pipe, hereinafter described.

I will first describe the construction shown in the first figure. The filtering-chamber A has a smaller filtering-chamber, B, located within it, an annular space, a, being thereby formed between the walls of the two, and suitable communication being provided at the bottom of the inner chamber to permit the water to pass therein from the annular space. An upright pipe, C, is located centrally within the inner chamber, and is provided at its top with a small hole covered by a strainer. Its bottom communicates with a reservoir, D, located below both said chambers. From the bottom of this reservoir leads a depending pipe, E, to the top of a cooling-chamber, F, located at a suitable distance beneath the surface of the ground. A discharge-pipe, G, extends from the bottom of this cooling-chamber upward to a point a little below the horizontal plane of the reservoir. An upright air-pipe, H, connects at its bottom with the upper portion of the reservoir D, and is provided at its top with air-holes. An upwardly-seating valve, b, operates within the air-pipe as follows: Valve-seat c is formed in upper portion of the air-pipe. The valve-stem passes upwardly through the valve-opening, and is provided with a pin to prevent the stem from passing down totally through the valve-opening. A chain, d, connects the valve to a longitudinal hollow float, e, adapted to rise and fall freely in the air-pipe. As the filtered water passes into the reservoir, it also passes up into the air-pipe, raises the float, and the latter, by direct contact with the valve, closes the same. The filtered water is thus prevented from escaping through the air-pipe. As the water passes out from the reservoir through pipe E, it falls in the air-pipe. The float correspondingly falls and the valve opens, permitting air to enter. A small filtering-chamber, K, is located above chamber A, and is provided with a blow-out pipe, f, connecting with its upper side portion. The water passes from the hydrant into the top of chamber K by pipe f', percolating through the filtering material of said chamber and down through the filtering material in chamber A, thence up through the filtering material in chamber B. The filtered water collects at the top of this latter chamber in a water-space, g, formed above the filtering material, and thence passes through the strainer and pipe into the reservoir. It is thence conducted to the cooling-chamber, and, as desired for use, is discharged by the discharge-pipe G. By reason of this discharge-pipe connecting with the bottom of the cooling-chamber, the coldest water is taken from the latter, and by reason of the discharge of the pipe being lower than the reservoir the water is forced therefrom as permitted by the stop-cock. The main portion of the impurities of the water passed into the filter collects in the chamber K, and may be discharged therefrom by means of the blow-out pipe. The water cannot pass down through chamber A nor up through chamber B faster than the pipe C will take the filtered water from water-space g. By reason of this the water is caused to percolate slowly and evenly through the filtering material, rendering the process thorough and complete.

In Fig. 2 of the drawings the filter is connected with a cistern, L. In this instance the water-reservoir D is provided with an air-pipe, *l*, and a pump-pipe, *m*. The operation of filtering is substantially the same as previously described. The filtered-water reservoir according to this construction, being located in the ground beneath the cistern, maintains the water cool.

What I claim is—

1. The combination, with outer filtering-chamber, A, and inner filtering-chamber, B, provided with water-space *g* in its top, of the filtered-water reservoir D, located immediately below said chambers, and pipe C, connecting the reservoir with said water space, substantially as set forth.

2. The combination, with chamber A, adapted to filter the water downward, and chamber B inclosed therein and communicating at its bottom therewith, said chamber B adapted to filter the water upward, and provided at its top with water-space *g*, of filtered-water reservoir D, located immediately below both said chambers, and pipe C, located within chamber B, and having its upper extremity communicating with water-space *g*, and its lower extremity communicating with top of said reservoir, substantially as set forth.

3. The combination, with filtering-chamber B, inclosed within filtering-chamber A, reservoir D, located immediately below both said chambers, and pipe C, connecting the upper portion of chamber B with the reservoir, of depending pipe E, cooling-chamber F, and pipe G, having its discharge at a point below the horizontal plane of said reservoir, substantially as set forth.

4. The combination, with reservoir D, having supply-pipe C connecting with its top, and discharge-pipe E connecting with its bottom, of air-pipe H, connecting with the upper side portion of said reservoir, and provided with float *e* and valve *b*, said air-pipe having an open upper end, substantially as set forth.

In testimony that I claim the foregoing to be my invention I have hereunto set my hand this 22d day of September, A. D. 1883.

EDWARD W. KIDNEY.

Witnesses:
 WM. BUSBY,
 A. OSBORN.